United States Patent [19]

Taylor et al.

[11] 4,046,957
[45] Sept. 6, 1977

[54] PIN STRUCTURE FOR MODULAR WIRING DUCT AND WIRE HOLDER SYSTEM

[75] Inventors: Philip W. Taylor, Burnet, Tex.; Rollin G. Scheidler, Howell, Mich.

[73] Assignee: Taylor Industries, Inc., Howell, Mich.

[21] Appl. No.: 598,572

[22] Filed: July 24, 1975

[51] Int. Cl.$^2$ .................. H02G 3/02; F16B 19/00
[52] U.S. Cl. .................. 174/72 A; 24/73 P; 174/138 D
[58] Field of Search ............ 174/72 A, 138 D, 153 G, 174/164; 24/73 HS, 73 P, 73 PF, 73 PM, 73 SA, 73 AP, 208 A, 213 R, 213 CS, 214, 220; 248/71, 73, 223, DIG. 3; 339/126 R, 126 RS, 128

[56] References Cited

U.S. PATENT DOCUMENTS

| | | | |
|---|---|---|---|
| 2,442,754 | 6/1948 | Beam | 174/138 D UX |
| 3,033,624 | 5/1962 | Biesecker | 174/153 G X |
| 3,906,146 | 9/1975 | Taylor | 174/72 A |

Primary Examiner—Laramie E. Askin
Attorney, Agent, or Firm—Hauke & Patalidis

[57] ABSTRACT

A pin structure for a wiring duct and wire holder modular system for use in wiring electrical equipment as used in control panels and electrical cabinets for machine tools, industrial installations, computers and the like, consisting of modular units for supporting and distributing to electrical equipment a plurality of electrical conductors which are routed through a plurality of wiring duct modular units interlocked end to end or at a right angle to each other for forming branching wireways, or T-connections, and turns, or L-connections. Each modular unit consists of a base member and of a row of pins mounted on two parallel edges of the base member, each pin having a tapered foot portion for insertion into a mounting aperture in the base member comprising laterally projecting flange sections of a major dimension slightly larger than the diameter of the mounting aperture in the base member, a peripheral groove being disposed proximate the projecting flange sections and being so dimensioned as to snugly fit in the mounting aperture. The pins are provided with an enlarged head portion so as to form between consecutive pins a space through which individual electrical conductors may be routed through the sidewall of the guideway.

6 Claims, 3 Drawing Figures

U.S. Patent    Sept. 6, 1977    4,046,957
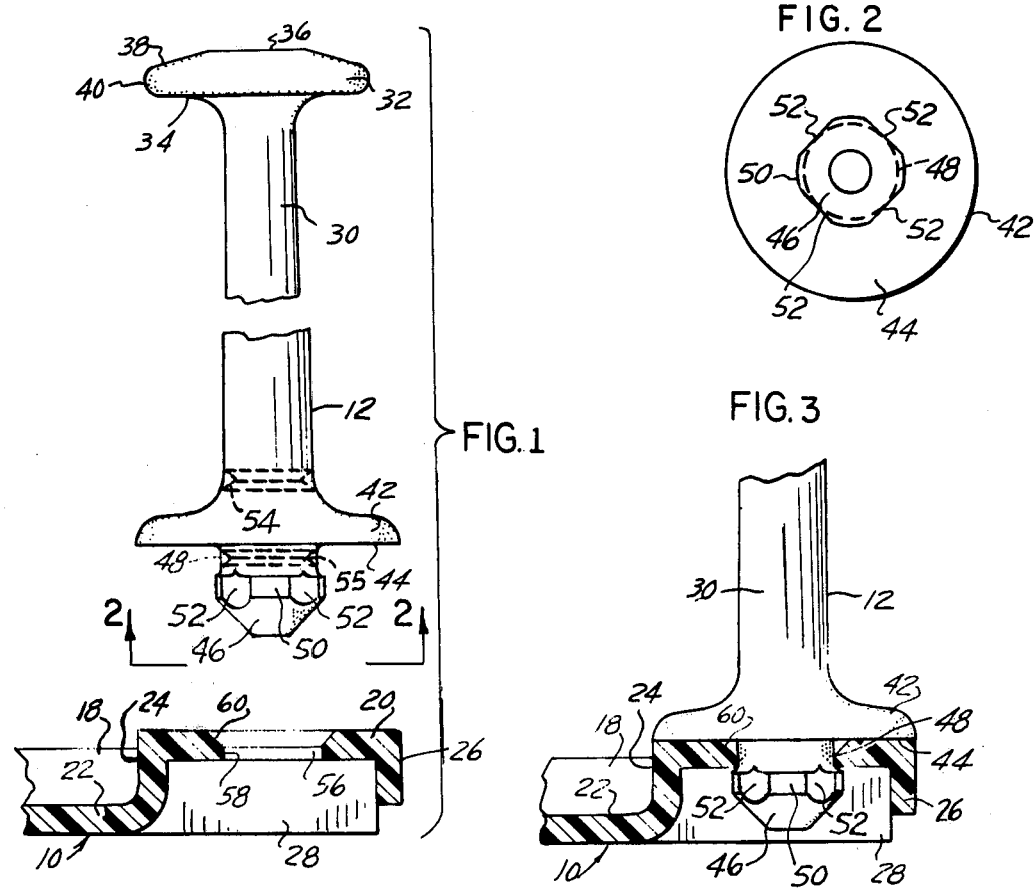

PIN STRUCTURE FOR MODULAR WIRING DUCT AND WIRE HOLDER SYSTEM

CROSS-REFERENCE TO RELATED APPLICATIONS

This application relates to an improvement on the invention disclosed and claimed in application Ser. No. 440,146, filed Feb. 6, 1974, and assigned to the same assignee as the present application, now U.S. Pat. No. 3,906,146, issued Sept. 16, 1975.

BACKGROUND OF THE INVENTION

The present invention relates to wiring ducts, or wireways, for supporting and holding bundles of electrical conductors interconnecting diverse components in control panels and electrical cabinets.

The present invention is an improvement on the structure disclosed and claimed in U.S. Pat. No. 3,906,146 which contemplates a modular wiring duct system made of interlocking duct modular units which, when disposed end-to-end, provide a wiring duct of an appropriate length. Each modular unit consists of a molded base portion provided with appropriate stiffening ribs and with mounting apertures, and having at each end appropriate interlocking means for connection to another modular unit disposed in alignment therewith. A sidewall is formed along the edge of the base portion by a row of elongated relatively slender pins provided with an enlarged head, such that a relatively large area opening is provided between two consecutive pins for the passage of electrical conductors through the sidewalls. The electrical conductors are retained in the opening as a result of the interference provided by two adjacent enlarged pin heads preventing the electrical conductors from slipping off the opening until the cover is placed on the duct.

The pins are molded with an appropriate cross section, preferably circular, such as to provide a smooth rounded contact with the insulation of the electrical conductors, and such as to be easily manually deflected laterally in any direction, while still being provided with considerable holding power for the conductors disposed in the duct. Preferably yet, the pins are molded with a slight taper from bottom to top such as to have an increased strength where most required, namely at the root of the pins where they are attached to the base.

The pins are mounted in appropriate apertures disposed along each of the parallel sides of the base portion and the end of each pin mounted on the base portion has a tapered projecting portion snapped into the aperture in the base portion for providing sturdy mounting and ease in assembly. Any length of wiring ducts may be provided by mounting the modular units end-to-end or at right angle for forming T- and elbow, or L-connections. In addition, a corner unit forming part of the system is provided for installation where it is desired to close an end of a duct or to provide an L-connection with apertured sidewalls. An appropriate cover is part of the system to provide a closure for the wiring ducts used in electrical installations.

By omitting one of the sidewalls, the structure provides fanning strips and the like, and, in addition to having many applications in the electrical equipment wiring art, the structure may be used as a holding and distribution duct for fluid hoses and the like, or as a holder for a plurality of articles such as strings, ropes, smoking pipes, etc., and as racks for small tools, neckties and the like.

SUMMARY OF THE INVENTION

The present invention is an improvement on the novel wiring duct modular system of U.S. Pat. No. 3,906,146, and more particularly it is an improvement on the structure of the pin foot portion permitting to facilitate the mounting of the pins in the mounting apertures of the duct base member.

The structure by which the pins, according to the present invention, are fastened to the support base portion consists of a tapered foot portion pressed into an aperture in the base portion, the tapered projecting portion being provided with at least a pair of radially projecting arcuate flange sections which, when pressed into the aperture, are resiliently partly contracted and which partly resiliently and partly permanently cause a local enlargement of the aperture which partly contracts after passage of the flange portion therethrough, thus holding the pins in position, a groove of a diameter substantially equal to the diameter of the aperture being disposed at the foot portion of the pin above the tapered projecting portions.

The many objects and advantages of the present invention will become apparent to those skilled in the art when the following description of the preferred embodiments is read in conjunction with the accompanying drawings wherein:

BRIEF DESCRIPTION OF THE DRAWINGS

FIG. 1 is an exploded detail view of an example of pin according to the present invention and of a portion of the base member of a wiring duct prior to mounting the pin into the base member;

FIG. 2 is a view from line 2—2 of FIG. 1; and

FIG. 3 is a view similar to FIG. 1, but showing the assembled pin and base member.

DETAILED DESCRIPTION OF THE PREFERRED EMBODIMENT

The present invention is an improvement on the wiring duct system disclosed in U.S. Pat. No. 3,906,146 which consists of a basic modular unit which, as illustrated partially at FIGS. 1–3, comprises a base member portion 10 provided with a pair of parallel sidewalls disposed at two parallel sides of the base member 10, each sidewall being formed by a row of pins 12. In this manner, each base member 10, provided with two parallel rows of pins 12, forms a U-shaped channelway (not shown) through which may be routed a plurality of electrical conductors.

The base member 10 is preferably made of a rectangular shaped molding of plastic material, relatively thin for economy of material and lightness, but provided with appropriate stiffening ribs 18 formed on the upper surface of the central portion 22 thereof and disposed transversely between two substantially U-shaped integral edge portions 20 intended to support the pins 12. Each edge portion 20 is connected to the central portion 22 of the base member 10 by an integral vertical wall 24, and is provided with an exterior wall 26 having a terminal edge ending slightly above the plane of the lower surface of the central portion of the base member 10. Stiffening transverse walls 28 are formed at regular intervals at the bottom of the edge portion 20 of the base member, having an edge flush with the plane of the lower surface of the central portion 22 of the base member 10, such that when the base portion 10 is disposed on a surface, it is fully supported by that surface across its full width.

The pins 12 are molded of a relatively stiff, while at the same time flexible, plastic material and have an elongated body 30 of any convenient cross section such as square, rectangular, oval, and the like, but preferably a circular cross section. Also preferably, and as illustrated, the body 30 of the pins 12 is slightly frusto-conical, that is with a diameter proximate the base larger than the diameter proximate the free end of the pins. As best shown at FIG. 1, the free end of each pin is formed with an enlarged head portion 32 which is preferably mushroom-shaped, with a flat annular lower surface as shown at 34, a flat upper surface 36 of substantially smaller diameter than the overall diameter of the enlarged head portion 32, and a frusto-conical surface 38 disposed between the top surface 36 of the enlarged head portion 32 and the rounded side 40 of the enlarged head.

Each pin 12 has a foot portion comprising generally a radially extending flange 42 having a substantially flat lower surface 44, and an integral projecting tapered end portion 46. The tapered end portion 46 has a reduced diameter portion 48 defining a peripheral groove disposed proximate the radially extending flange 42. The tapered end portion 46 is provided, proximate the peripheral groove 48, with a laterally extending arcuate flange section 50, four such flange sections 50 diametrally opposed two by two being so illustrated in the example of the structure, as best shown at FIG. 2. The major diameter dimension of the pin tapered end portion across each pair of opposed flange sections 50 is slightly larger than the reduced diameter portion 58 of the mounting aperture 56 and substantially flat portions 52 and disposed between consecutive laterally extending arcuate flange sections 50, as clearly shown at FIG. 2, a pair of such flat portions being diametrically opposed at a distance substantially equal to the diameter of the groove 48.

As best shown at FIG. 1 and also at FIG. 3, the edge portion 20 of the base member 10 is provided with an aperture 56 for accepting therethrough the projecting tapered end portion 46 of each pin 12. The aperture 56 has a narrow section 58 of a dimension corresponding to, or slightly smaller than, the dimension of the groove portion 48 of the pin, a frusto-conical countersunk section 60 being disposed towards the upper surface of the base member edge section 20, such that when the projecting tapered end portion 46 of the pin 12 is forcibly inserted into the aperture 56, such insertion is greatly facilitated by the tapered shape of both the frusto-conical portion 60 of the aperture 56 and the tapered shape of the pin projecting portion 46. The engagement of the pin projecting tapered end portion 46 into the aperture 56 causes the laterally projecting flange sections 50 to progressively bend very slightly, due to the resiliency of the pin material, while at the same time causing a local enlargement of the aperture 56, due to the resiliency of the base material, until the reduced diameter or groove portion 48 thereof becomes lodged into the reduced diameter section 58 of the aperture 56, at which time the projecting flange sections 50 of the projecting end portion of the pin and the edge of the aperture 56 return to their normal positions, thus solidly holding the pin in position, as is illustrated at FIG. 3. The length of the pin projecting tapered end portion 46 is such as to clear the support surface, such length being less than the height of the walls 28.

If so desired, the surface of the pin groove 48 may be coated with an appropriate cement or, alternatively or in addition, the lower surface 44 of the pin flange 42 may also be coated with a cement. It will be appreciated, however, that the use of cement is not required as the structure of the projecting end portion 46 of the pin provides an adequate locking engagement of the pin projecting end portion 46 in the aperture 56 in the base member. If it is desired to remove a pin, pliers may be used for compressing the projecting flange sections 50 or for breaking off such projecting flange sections sufficiently to permit the removal of the pin from the aperture 56, or the pin projecting end portion 46 may simply be broken off. A V-shaped groove, as shown in dotted lines at 54 of FIG. 1, may be provided about the periphery of the pin at the bottom thereof, or as shown in dotted lines at 55 within the groove portion 48, for the purpose of facilitating the breaking off of the pin.

Having thus described the invention by way of typical structural embodiment thereof, what is claimed as new is as follows:

1. In a holder for supporting, containing and distributing a plurality of electrical conductors which comprises a base plate member made of plastic material and having a lower and an upper surface, a plurality of aligned apertures disposed substantially parallel to an edge of said plate member and pins on the upper surface of said plate member each disposed in one of said apertures, each of said pins being made of plastic material and having an elongated body portion provided at an end thereof with an enlarged head portion and at the other end thereof with a foot portion for mounting on said plate member, said foot portion comprising a radially extending flange portion in engagement with the upper surface of said base plate member and a tapered projecting portion inserted in said aperture, the improvement comprising said tapered projecting portion of said pin foot portion having laterally projecting flange sections of a major dimension slightly larger than the diameter of said aperture separated by substantially flat portions of a minor diameter substantially equal to the diameter of said aperture, a peripheral groove disposed proximate said projecting flange sections between said projecting flange sections and said radially extending flange portion, said groove being so dimensioned as to snugly fit in said aperture, said projecting flange sections being caused to laterally contract in part resiliently and in part permanently and the edge of said aperture being caused to correspondingly enlarge in part resiliently and in part permanently during insertion of said tapered projecting portion into said aperture and to subsequently resiliently respectively expand and contract partly for directly and positively holding the foot portion of said pin with said groove engaged in said aperture.

2. The holder of claim 1 wherein the improvement further comprises a V-shaped groove disposed within said peripheral groove.

3. The holder of claim 1 wherein the improvement further comprises a V-shaped groove about the periphery of said pin proximate and above said radially extending flange portion.

4. In a modular holder unit for supporting and distributing a plurality of elongated flexible objects which comprises a base member and a plurality of pins disposed in a row parallel to one of the sides of said base member, wherein said base member has a plurality of aligned apertures disposed substantially parallel to an edge of said base member and each of said pins has a foot portion comprising a radially extending flange portion in engagement with the upper surface of said base member and a tapered projecting portion inserted in said aperture, the improvement comprising said tapered projecting portion of said pin foot portion having laterally projecting flange sections of a major dimension slightly larger than the diameter of said aperture separated by substantially flat portions of a minor diameter substantially equal to the diameter of said aperture, a peripheral groove disposed proximate said projecting flange sections between said projecting flange sections and said radially extending flange portion, said groove being so dimensioned as to snugly fit in said aperture, said projecting flange sections being caused to laterally contract in part resiliently and in part permanently and the edge of said aperture being caused to correspondingly laterally enlarge in part resiliently and in part permanently during insertion of said tapered projecting portion into said aperture and to subsequently resiliently respectively expand and contract partly for directly and positively holding the foot portion of said pin with said groove engaged in said aperture.

5. The modular holder unit of claim 4 wherein the improvement further comprises a V-shaped groove disposed within said peripheral groove.

6. The modular holder unit of claim 4 wherein the improvement further comprises a V-shaped groove about the periphery of said pin proximate and above said radially extending flange portion.

* * * * *